United States Patent
Rasanen

(10) Patent No.: US 9,578,545 B2
(45) Date of Patent: Feb. 21, 2017

(54) CONTROLLING DATA SESSIONS IN A COMMUNICATION SYSTEM

(75) Inventor: Juha A. Rasanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1745 days.

(21) Appl. No.: 10/878,609

(22) Filed: Jun. 29, 2004

(65) Prior Publication Data

US 2005/0149754 A1 Jul. 7, 2005

(30) Foreign Application Priority Data

Jan. 5, 2004 (GB) .................................. 0400080.8

(51) Int. Cl.
*H04W 4/00* (2009.01)
*H04W 28/10* (2009.01)
*H04L 29/12* (2006.01)
*H04L 12/801* (2013.01)
*H04L 12/813* (2013.01)
*H04L 29/08* (2006.01)
*H04L 12/24* (2006.01)
*H04W 72/12* (2009.01)
*H04W 88/18* (2009.01)
*H04L 29/06* (2006.01)

(52) U.S. Cl.
CPC ........ *H04W 28/10* (2013.01); *H04L 29/12066* (2013.01); *H04L 47/10* (2013.01); *H04L 47/14* (2013.01); *H04L 47/20* (2013.01); *H04L 61/1511* (2013.01); *H04L 67/14* (2013.01); *H04L 67/141* (2013.01); *H04L 67/147* (2013.01); *H04L 67/322* (2013.01); *H04L 41/0893* (2013.01); *H04L 65/1069* (2013.01); *H04L 65/80* (2013.01); *H04W 72/1257* (2013.01); *H04W 88/18* (2013.01)

(58) Field of Classification Search
USPC ........ 370/338, 349, 231; 709/204, 223–227; 730/338, 349, 231; 713/201
See application file for complete search history.

(56) References Cited

U.S. PATENT DOCUMENTS

| | | | |
|---|---|---|---|
| 6,584,454 B1 | 6/2003 | Hummel, Jr. et al. | |
| 6,845,389 B1 * | 1/2005 | Sen et al. | 709/204 |
| 6,937,566 B1 * | 8/2005 | Forslow | 370/231 |
| 7,284,053 B1 * | 10/2007 | O'Rourke et al. | 709/226 |
| 2002/0034935 A1 | 3/2002 | Bjelland et al. | |
| 2002/0062378 A1 | 5/2002 | Chantrain et al. | |

(Continued)

FOREIGN PATENT DOCUMENTS

| | | |
|---|---|---|
| WO | WO 01/76286 A1 | 10/2001 |
| WO | WO-03/003690 A1 | 1/2003 |

OTHER PUBLICATIONS

Koskelainen et al., "*Use of Session Initiation Protocol (SIP) and Simple Object Access Protocol (SOAP) for Conference Floor Control*", Internet Engineering Task Force, Mar. 2, 2003, pp. 1-35.

(Continued)

*Primary Examiner* — Justin Lee
(74) *Attorney, Agent, or Firm* — Mintz Levin Cohn Ferris Glovsky and Popeo, P.C.

(57) ABSTRACT

A communication system configured to provide at least two policy controlled data sessions on a data carrier is disclosed. The communication system comprises means configured to provide control such that at least two data sessions on a data carrier are policy controlled by means of a policy controller entity.

11 Claims, 4 Drawing Sheets

(56) References Cited

U.S. PATENT DOCUMENTS

| | | | |
|---|---|---|---|
| 2002/0062379 A1* | 5/2002 | Widegren et al. | 709/227 |
| 2003/0204596 A1* | 10/2003 | Yadav | 709/226 |
| 2004/0064541 A1* | 4/2004 | Ebata et al. | 709/223 |
| 2005/0025116 A1* | 2/2005 | Chen et al. | 370/349 |
| 2005/0147072 A1* | 7/2005 | Mahendran | H04L 12/5695 370/338 |

OTHER PUBLICATIONS

3GPP TR 23.917, "Dynamic Policy control enhancements for end-toend QoS", VO.4.1, Dec. 1, 2002.

* cited by examiner

CONTROLLING DATA SESSIONS IN A COMMUNICATION SYSTEM

BACKGROUND OF THE INVENTION

Field of the Invention

This disclosure generally relates to data sessions, and in particular to control of data sessions that may be simultaneously provided for a user equipment. The user equipment may have data sessions, for example, with a plurality of service applications.

Description of the Related Art

A communication system can be seen as a facility that enables communication sessions between two or more entities such as user equipment and/or other nodes associated with the system. Establishment of a communication session enables a user to be provided with various services. The communication may comprise, for example, communication of voice, video or other audio and/or image data, multimedia or any other data. A session may, for example, comprise a two-way telephone call or multi-way conference session or connection between a user equipment and an application function, for example an application server (AS), such as a service provider server or a proxy.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on may need to be defined to enable communication by means of the system.

Signalling is an example of a function that is commonly defined in an appropriate communication protocol or protocols. Signalling between various entities associated with a communication session is typically required in order to control the communication session. Control is typically required for the set-up of the communication session and also later on during communication on the established communication session.

Communication media between two or more parties may be provided by fixed line and/or wireless communication interfaces. Examples of fixed line systems include a public switched telephone network (PSTN), a local area network (LAN) and any other data network provided by means of fixed connections between the nodes thereof. The wireless communication may be provided, for example, by means of a mobile communication system or wireless local area networks (WLANs). Mobile communication system refers generally to any telecommunications systems which enable a wireless communication when users are moving within the service area of the system. An example of a typical mobile communication system is a Public Land Mobile Network (PLMN).

A mobile communications network can provide an access network providing a user with a wireless access to external networks, hosts, or services offered by specific service providers. The user may need to have a subscribership with the mobile communications system in order to be able to use the services of the mobile system. The mobile subscription information of the subscriber may indicate parameters such as parameters regarding the quality of service (QoS) the subscriber is entitled to receive, priorities, service restrictions, security, authentications, and so on.

An access point or gateway node of the mobile communication network provides further access to external networks or external hosts. For example, if the requested service is provided by a service provider located in another network, the service request is routed via a gateway to the other network and the service provider.

Various user equipment (UE) such as computers (fixed or portable), mobile telephones and other mobile stations, personal data assistants or organizers, and so on may be used for accessing services via a communication system. Mobile user equipment, typically referred to as a mobile station (MS), can be defined as a means that is capable of communication via a wireless interface with another device such as a base station of a mobile telecommunication network or any other station. The increasing popularity of Third Generation (3G) communication systems will, in all likelihood, significantly increase the possibilities for accessing services on the packet data networks via mobile user equipment (UE) as well as other types of UE.

The term "service" used above and hereinafter will generally be understood to broadly cover any service or goods which a user may desire, require or be provided with. The term also will generally be understood to cover the provision of complementary services. For example, but not exclusively, the term "service" will be understood to include browsing, downloading, email, streaming services, Internet Protocol (IP) multimedia (IM) services, conferencing, telephony, gaming, rich call, presence, e-commerce and messaging, for example, instant messaging.

A more detailed example of a wireless packet switched communication system will now be described with reference to general packet radio service (GPRS). The GPRS operational environment comprises one or more subnetwork service areas, which are interconnected by a GPRS backbone network. Each subnetwork may comprise a number of packet data service nodes (SN). In this specification the service nodes will be referred to as serving GPRS support nodes (SGSN). Each of the SGSNs is connected to radio networks, typically to base station systems and/or radio access networks by way of base station controllers (BSC) and/or radio network controllers (RNC) in such a way that they can provide a packet service for mobile user equipment via several base stations. The intermediate mobile communication network provides packet-switched data transmission between a support node and mobile user equipment. The subnetworks are in turn connected to an external data network, e.g. to a packet data network (PDN), via GPRS gateway support nodes (GGSN). The GPRS thus allow transmission of packet data between mobile user equipment and external data networks.

A packet data protocol (PDP) context may be established to carry traffic flows over the packet switched communication system. A PDP context typically includes a radio access bearer provided between the user equipment, the radio network controller and the SGSN, and switched packet data channels provided between the serving GPRS service node (SGSN) and the gateway GPRS service node (GGSN). A session between the user equipment and other party would then be carried on the established PDP context. A PDP context can carry more than one traffic flow, but all traffic flows within one particular PDP context are treated the same way as regards their transmission across the network. This requirement regarding the similar treatment is based on PDP context treatment attributes associated with the traffic flows.

These attributes may comprise, for example, quality of service and/or charging and/or filtering attributes.

A policy controller entity, for example a policy decision function (PDF), can be provided for controlling the transport layer of a PDP context. The policy decision function (PDF) may be provided by any appropriate controller entity. The PDF and GGSN are commonly arranged to communicate information to enable co-operation between the GPRS bearer level and the IMS level of the communication system. The PDF may be used for storing attributes for the purposes of functions such as the Quality of Service, filtering of data packet in the GGSN and so on.

A session related set of binding information generated by a policy decision function (PDF) and sent to the GGSN via the user equipment (UE) can be used to verify that the PDP context operations requested by the user equipment comply with the preceding negotiation during the set-up or modification of the PDP context. As a result of the verification, the PDF authorizes for example QoS parameters for the GGSN.

However, since a gateway node may connect the user to a number of data networks, it is possible to apply policy control to other services than services provided by a network, for example by an Internet Protocol Multimedia System. The application servers or other application functions may reside in different networks than the network associated with the used policy decision function. Nevertheless, a user equipment may have several simultaneous sessions with different application functions. When a user equipment multiplexes several application session in one PDP context, the same policy decision function should be used for policing all related session to avoid complications in the gateway. In certain standards control of a data carrier by a number of policy controller entities is even prohibited. A problem in here is that if simultaneous sessions use different application functions, there is no mechanism how a connection might be provided between these application functions and the policy decision function already assigned for one of the data sessions. Consequently, the sessions cannot be multiplexed in the same data carrier, such as a PDP context.

SUMMARY OF THE INVENTION

Embodiments of the present invention aim to address one or more of the problems associated with data carriers carrying more than one policy controlled session.

According to one embodiment there is provided a communication system configured to provide at least two policy controlled data sessions on a data carrier, the communication system comprising means configured to provide control such that at least two data sessions on a data carrier are policy controlled by means of a policy controller entity.

According to another embodiment there is provided a method for controlling a plurality of sessions carried on a data carrier in a communication system, the method comprising:
 initiating a policy controlled session by means of a data carrier,
 routing signalling requesting for policy control for the session to an entity connected to the communication system;
 initiating set-up of a further session by means of the data carrier;
 routing signalling requesting for policy control for the further session to an entity connected to the communication system; and
 providing policy control for the two sessions by means of a policy controller entity.

According to yet another embodiment there is provided a controller means for controlling at least two sessions provided on a data carrier such that the session are policy controlled by a policy controller entity.

The embodiments may provide a solution wherein multiplexing of sessions in a same data carrier is enabled even if the sessions use services of different application functions.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
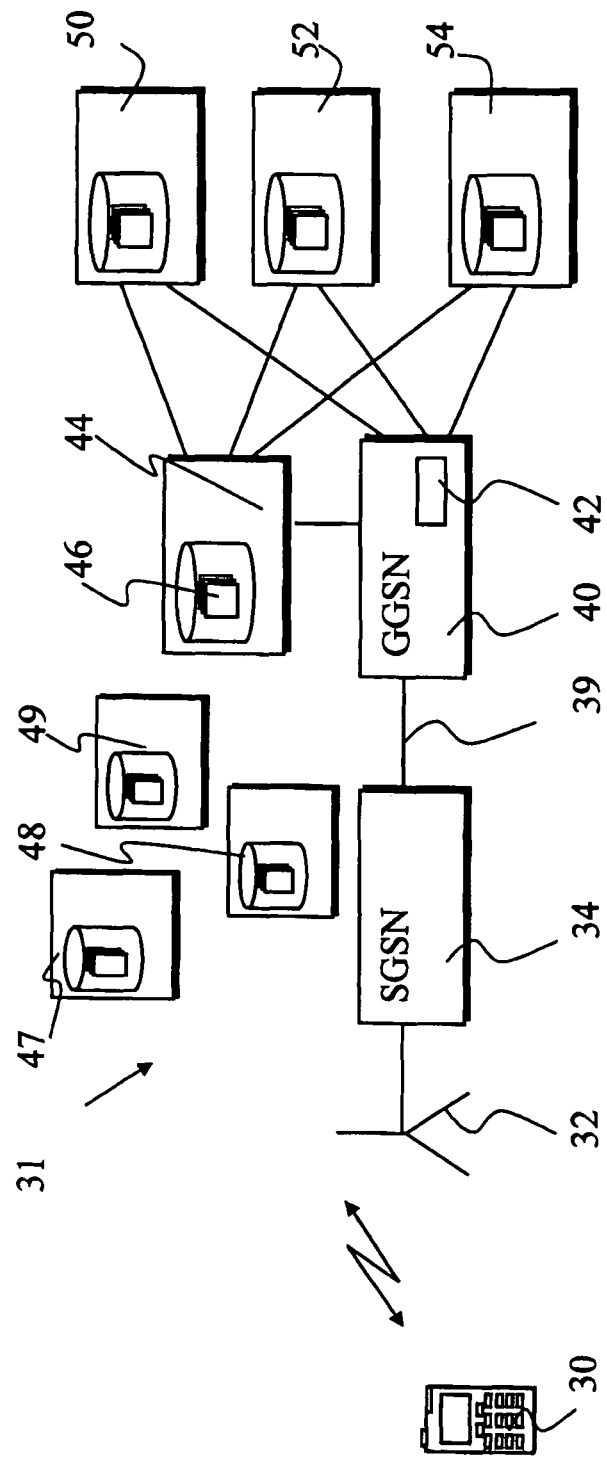
FIG. 1 shows schematically a communication system wherein the present invention may be embodied.

FIG. 1 shows a communication system suitable for embodying the present invention. More particularly, certain embodiments of the present invention will be described by way of example, with reference to the architecture of a third generation (3G) mobile communications system of FIG. 1. However, it will be understood that the invention may be applied to any other suitable form of communication network wherein a plurality of data sessions may be provided for a user equipment.

FIG. 1 shows a mobile user equipment 30. The basic operational principles of a mobile user equipment, that may also be referenced to as a mobile station, are generally known by the skilled person. A mobile user equipment is normally configured for wireless communication with other stations, typically with the base stations of a mobile communication system for enabling mobility thereof. A mobile user equipment may include an antenna element for wirelessly receiving and/or transmitting signals from and/or to the base stations of the mobile communication system. A mobile user equipment may also be provided with a display for displaying images and/or other graphical information for the user of the mobile user equipment. Speaker means are also typically provided. The operation of the mobile user equipment may be controlled by means of an appropriate user interface, such as control buttons, voice commands and so on. Furthermore, a mobile user equipment is typically provided with a processor entity and/or a memory means. Communication between the user equipment and the entities of the communication network may be based on any appropriate communication protocol. A user may use the mobile user equipment for tasks such as, but not limited to, for making and receiving phone calls, for receiving and sending data from and to the network and for experiencing, for example, multimedia content by means of PDP contexts. Non-limiting examples of user equipment comprise a Personal Computer (PC), Personal Data Assistant (PDA), mobile station (MS) and so on.

A mobile communication system, in turn, may logically be divided between a radio access network (RAN) and a core network (CN). In the simplified presentation of FIG. 1, the base station 32 belongs to the radio access network. It shall be appreciated that, although, for clarity, FIG. 1 shows the base station of only one radio access network, a typical communication network system usually includes a number of radio access networks. It shall also be understood that the mobile communication system 31 of FIG. 1 may be arranged to serve a plurality of mobile user equipment 30.

The 3G radio access network (RAN) is typically connected to an appropriate core network entity or entities such as, but not limited to, a serving general packet radio service support node (SGSN) 34. A subscriber information database entity for storing information associated with the subscriber of the user equipment 30 may also be provided. The HLR may contain various records associated with the subscriber, such as details of PDP context subscriptions of the subscriber.

A user equipment within the radio access network may communicate with a radio network controller via radio network channels which are typically referred to as radio bearers (RB). These radio network channels may be set up in a mobile communication system in a known manner. Each user equipment 30 may have one or more radio network channels open at any one time with the radio network controller. The radio access network controller is in communication with the serving GPRS support node 34 via an appropriate interface, for example on an Iu interface.

The serving GPRS support node 34, in turn, typically communicates with a gateway GPRS support node 40 via the GPRS backbone network on interface 39. This interface is commonly a switched packet data interface. The serving GPRS support node (SGSN) 34 and/or the gateway GPRS support node (GGSN) 40 are for provision of support for GPRS services in the network.

A data carrier between user equipment 30 in the access entity and the gateway GPRS support node 40 may be provided by means of a packet data protocol (PDP) context. Each PDP context usually provides a communication pathway between a particular user equipment and the gateway GPRS support node 40. Once established, a PDP context may carry multiple flows of several sessions. Each flow normally represents, for example, a particular service and/or a component of a particular service. The PDP context therefore often represents a logical communication pathway i.e. data carrier for one or more flows across the network. To provide a PDP context between the user equipment 30 and the serving GPRS support node 40, radio access bearers (RAB) are usually established which commonly allow for data transfer for the user equipment. The implementation of these logical and physical channels is known to those skilled in the art and is therefore not discussed further herein.

The user equipment may connect, via the GPRS network, to various application entities 50, 52 and 54 providing application functions. For example, the user may connect to servers that are generally connected to an external packet data network, for example to an Internet Protocol (IP) network. The application entities 50, 52 and 54 may be provided in different data networks.

FIG. 1 shows a policy controller entity, hereinafter referred to as a policy decision function (PDF) 44. The policy decision function (PDF) 44 may be provided by an appropriate controller entity. The policy decision function may be provided with an appropriate database 46 for storing information required by the policy control operations. A non-limiting example for the appropriate controller is an Internet Protocol Session Control (IPSC) entity.

A session related set of binding information may be generated by the policy decision function (PDF) 44 and sent via the user equipment to the GGSN 40 for use in checking that the PDP context operations requested by the user equipment 30 comply with the preceding negotiation on the data network level. As a result of the verification, the PDF 44 may authorize various communication parameters, for example Quality of Service parameters, for the GGSN 40.

Figure 2:
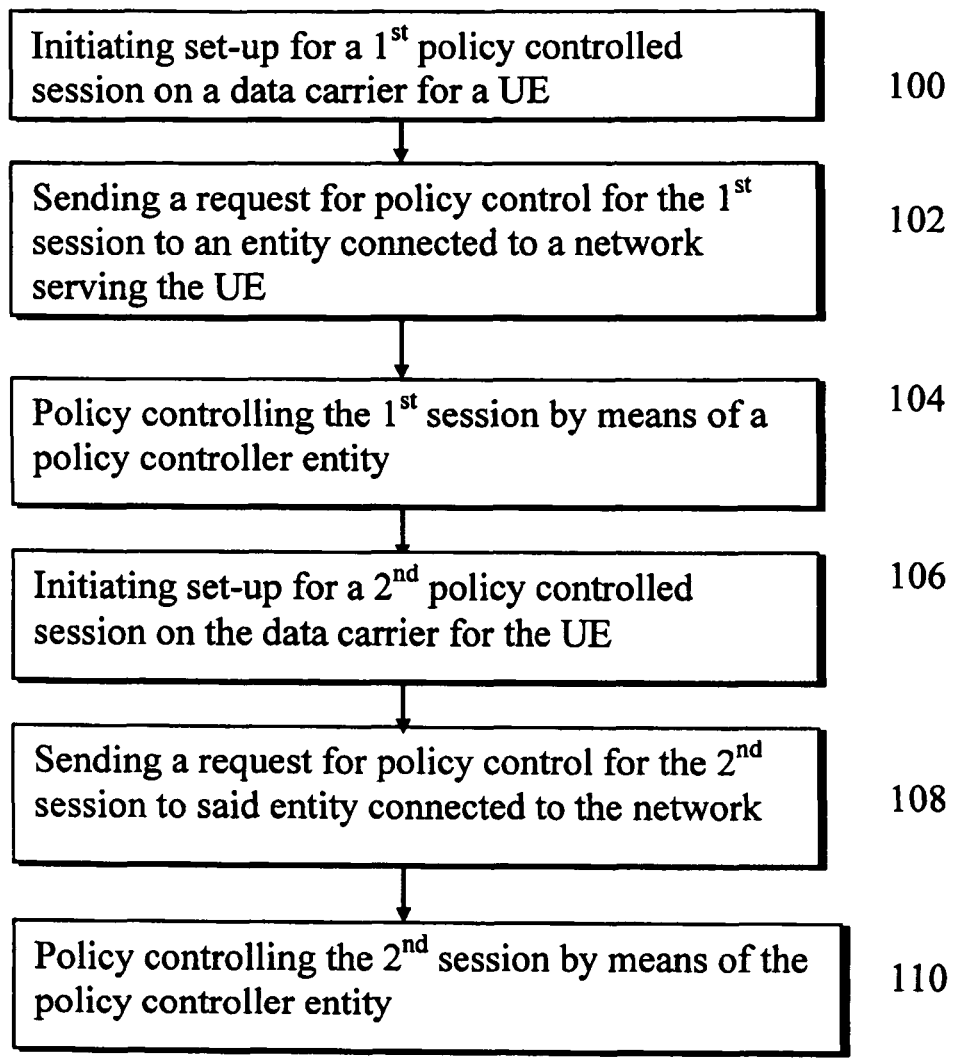
FIGS. 2 to 4 are flowcharts illustrating operation of possible embodiments of the present invention.
Figure 3:
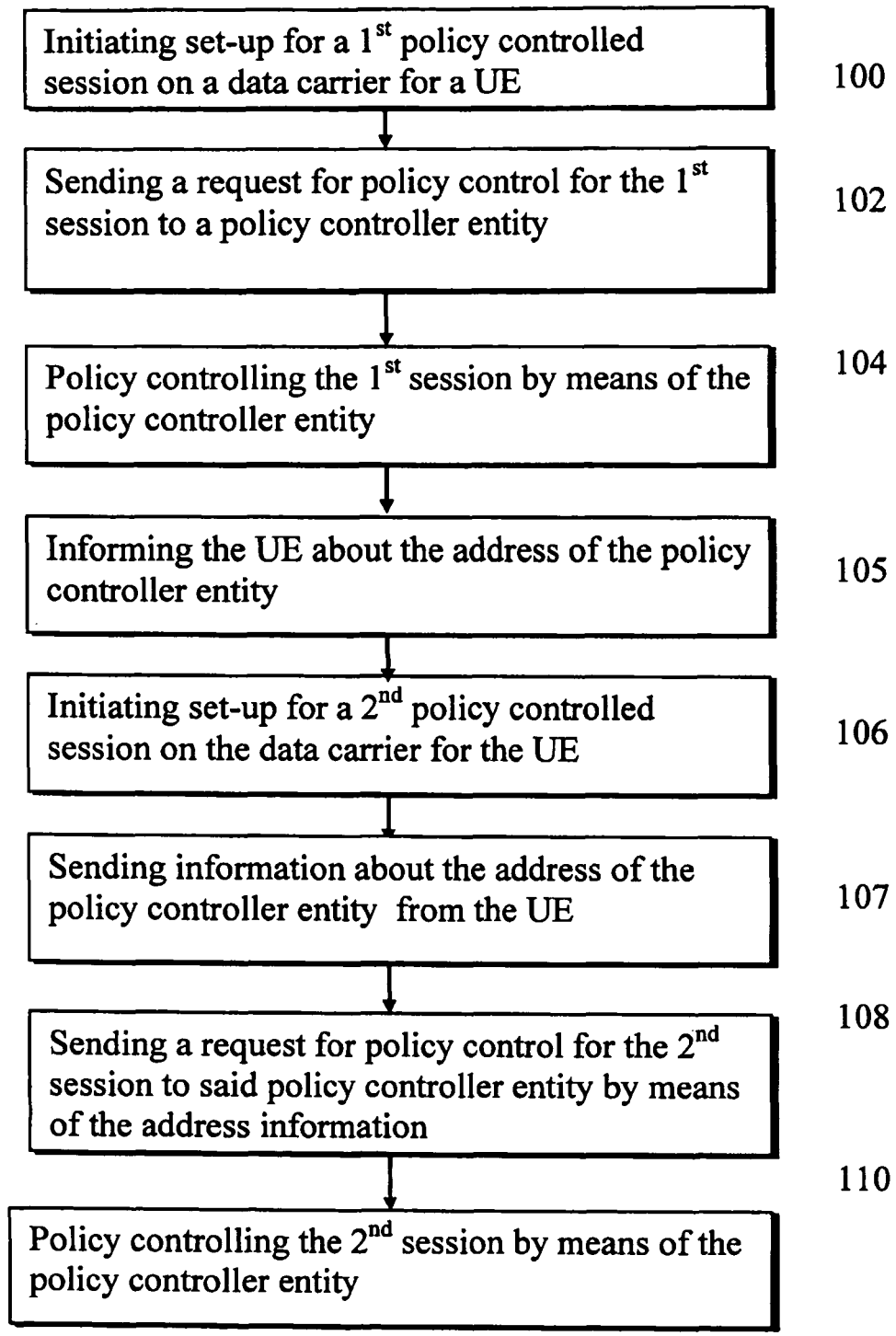
Figure 4:
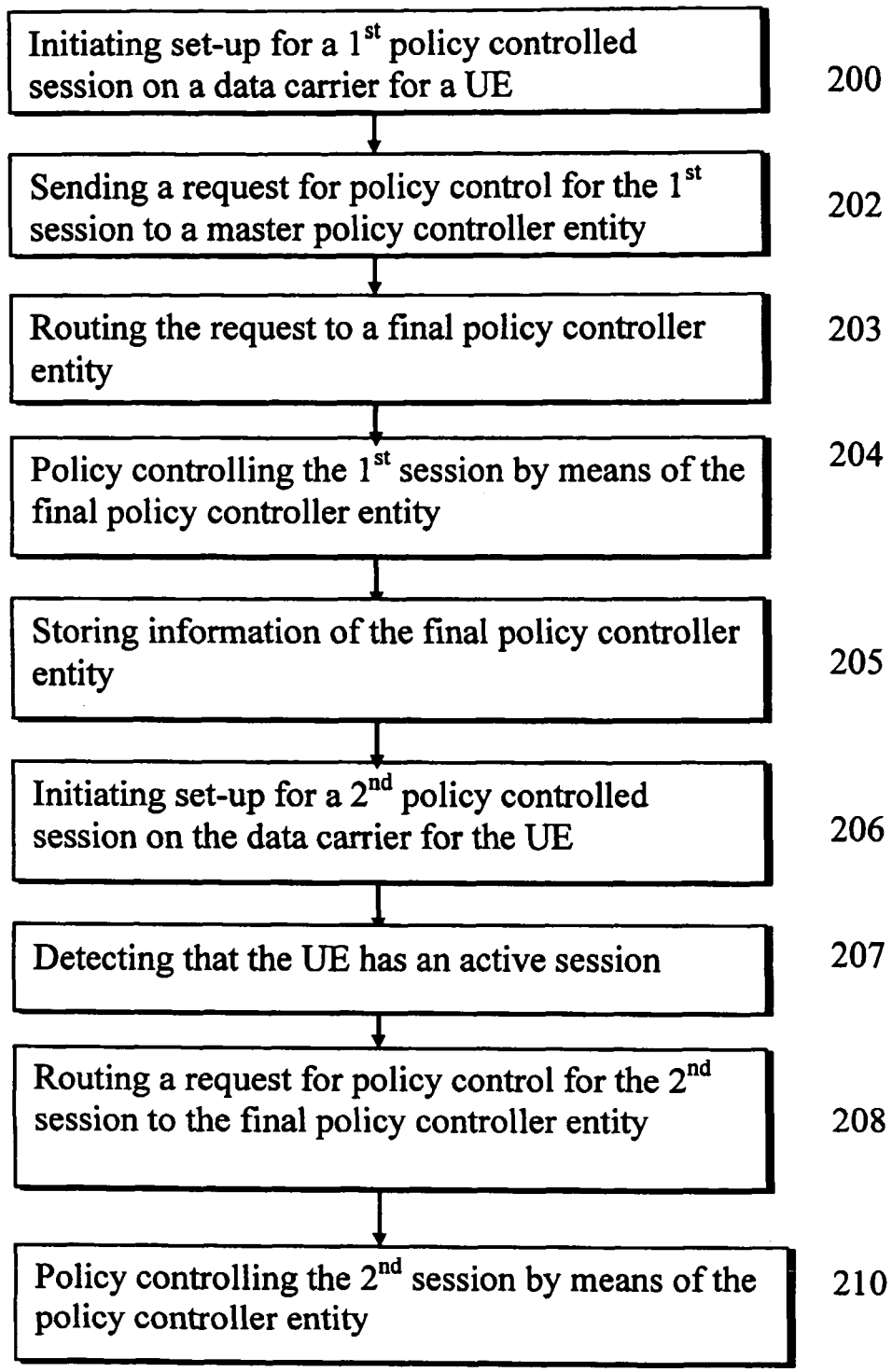

FIG. 2 shows operation in accordance with a general embodiment whereas FIGS. 3 and 4 show more detailed embodiments.

In FIG. 2 method for controlling a plurality of sessions carried on a data carrier a policy controlled $1^{st}$ session is initiated at step 100. A request for policy control for the session is routed at step 102 to an entity connected to the communication system. As discussed below, this entity is preferably, but not necessarily, a policy controller entity. The session may then be policy controlled at step 104 based on policy control parameters obtained in response to the request.

The user may initiate at step 106 a process to set-up a further session. A request for policy control for the further session is then signalled at step 108 to the same entity connected to the communication system as in step 102. The further session may then be policy controlled based on policy control parameters obtained in response to the request. As a result, the two sessions can be policy controlled by means of a single policy controller entity at step 110.

In accordance with the embodiment of FIG. 3, a user equipment 30 may provide at step 1 an application entity, for example an application server 50, with information about the address of the serving PDF 44. This naturally may only need to be done if the UE has already an ongoing session using the PDF 44.

Any appropriate messaging sequence of the prior art session establishment procedure may be used for the provision of the address information. No changes are necessary. Instead, in the simplest form only a parameter, a PDF address, may need to be added in the messages.

When the user equipment 30 contacts an application server at step 100 to set up a first policy controlled session, the application server may get an address to a PDF or a pool of PDFs, for example using a DNS (Domain name server). If there are several PDFs in a network, the final allocation of the PDF may be based on a network specific arbitrary or non-arbitrary selection mechanism.

The application server gets binding information with the final PDF address at step 102 from the PDF in response to the request of step 102. The binding information may be provided, for example, by means of an authorization token. The application server may then send the information to the user equipment in step 105 in response to the session request from the user equipment at step 100.

The user equipment may save the PDF address received within the binding information (for example, the authorization token) in a memory thereof. When the user equipment requests for another session at step 106 that might use the same PDP context already established for an existing session, the user equipment may send the previously saved PDF address to the application server in a request for the session.

The PDF address may be carried by any appropriate message, For example, a PDF address may be carried in a control protocol field, e.g. in a parameter extension of a SCTP (stream control transport protocol) message, or in a session specific attribute of the a SDP (session description protocol) message. The latter example is more general in practice because several session control protocols (e.g. SIP, SCTP) may use SDP. The application server may then use this address to address a request for policy control for the further session at step 108.

The following is an example of how to define the session specific attribute for the PDF address using the rules of SDP:

"a=<pdfaddr>:<addr-of-pdf>,
where
"a" is a session specific attribute,
"pdfaddr" is the name of the attribute, and
"addr-of-pdf" is the (Ipv6 or Ipv4) address value.

The application server uses the address of the "a=pdfaddr" attribute (or corresponding other parameter) as the PDF address at step 108, if the attribute (or parameter) is available. Thus the communication system may provide two policy controlled sessions that use two different application servers, with common policy decision function (PDF), based on information from a policy controller entity at step 110.

The attribute/parameter may not be available, or may have a dummy value, e.g. when the UE sets up a first session in a PDP context.

If the application server does not understand the "a=pdfaddr" attribute (or corresponding other parameter) and ignores it, different sessions most probably end up using different PDFs, and multiplexing the sessions in the same PDP context may not be possible. In such a case the UE may still set up separate PDP contexts or terminate the setup of the new session.

In accordance with a further embodiment possible fraudulent behaviour of the UE/user may be prevented by the GGSN. The exemplifying GGSN 40 of FIG. 1 is shown to be provided with a controller 42 configured to control the operation of the node 42 in accordance with the principles of this further embodiment. When the GGSN receives a PDP context activation or modification from the UE, the controller 42 of the GGSN 40 may check that the PDF address in the binding information belongs to the allowed addresses reserved for PDFs in the network. If the address is illegal, the GGSN rejects the operation.

The above described a situation wherein a session was originated by a user equipment. It is also possible to apply similar principles to session which are terminated at a user equipment. In this scenario a user equipment may receive binding information, for example an authorization token, with the PDF address in an invitation to join a session from an application server. If the user equipment wants to multiplex the session in a PDP context with an existing session, the user equipment may check whether the PDF address in the new set of binding information corresponds to the PDF address in the set of binding information for the existing session that is already using the PDP context. If the addresses are different, the user equipment may reject the session invitation and send a proper cause code in the reject message. The user equipment may include the address of the wanted/used policy decision function in the reject message. The PDF address may be carried by the protocols in a similar manner as described above. The application server may then provide a new session invitation using now the policy decision function identified by the user equipment in the reject message of the previous invitation.

Another embodiment will now be described with reference to FIGS. 1 and 4. In this embodiment the policy controller entity 44 provides a master policy decision function (PDF) or a gateway policy decision function for the communication network 31 while a number of further policy controller entities 47, 48 and 49 is provided in the network. The master policy decision function 44 keeps a record of ongoing policy controlled sessions in the network 31 and forwards new requests from application servers to policy decision functions making sure that simultaneous sessions of a given user equipment (UE) use the same policy decision function.

It is preferred if there is only one master policy decision function in a communication network. The master policy decision function may then receive all initial requests from application servers. The communication system may operate as follows.

More particularly, at step 200 the UE 30 contacts an application server to set up a first policy controlled session. The application server gets an address to a master policy decision function (PDF), for example by means of a DNS (Domain Name Server). The application server may then contact at step 202 the master PDF to get binding information with the final PDF address.

The master PDF may then route at step 203 the request to a proper PDF in the network. This PDF is called hereinafter "final PDF". The routing may be based e.g. on load sharing or on user/UE identity and so on. The master PDF registers the address/identity of the allocated final PDF for the subscriber/UE at step 105 in order to be able to route further requests from any application servers with the same user/UE identity to the same PDF.

The application server may receive binding information, for example an authorization token, with the final PDF address from the final PDF. The application server may then send the information to the UE in the response to a session request from the UE.

When the UE requests for another session at step 206 with any of application servers that could possibly use the same PDP context already established for an existing session, the master PDF recognizes at step 207 that there is already a PDF allocated to a session of the UE. Because of the master PDF now has data regarding the serving PDF, for example PDF 47, it may route at step 208 the request to this already allocated final PDF. The further session may then be policy controlled based on the instructions by the final PDF 47.

According to a possibility the master PDF sends the address of the final PDF to the user equipment or GGSN. Then the UE may add this address to the request as described with reference to FIG. 3, or the GGSN may take care of the rerouting operations.

At new requests and session terminations, the master PDF may also update a session counter or a session status record for the user/UE in order to be able to recognize, when the last session of the UE is terminated and the address of final/allocated PDF for the UE can be nullified.

The master PDF functionality may be decentralized in several or all PDFs of the network. However, this may increase message traffic between PDFs and PDF loading.

According to yet further embodiment, an appropriate network element (for example, a GGSN) may extract the PDF address from the binding information when the PDP context is activated for the first session, monitor later uplink traffic to find session setup requests and insert the PDF address in the requests.

It shall be appreciated that whilst embodiments of the present invention have been described in relation to user equipment such as mobile stations, embodiments of the present invention are applicable to any other suitable type of user equipment.

The examples are described with reference to PDP contexts. In alternative embodiments of the invention sessions may be carried on any suitable data carrier, for example a Wireless Local Area Network (WLAN) access bearer connected to a policy controlled packet mobile network.

The embodiments of the present invention have been described in the context of a communication system that is based on a GPRS system. This invention is also applicable to any other communication systems and nodes where similar problem may exist. In addition to a gateway node such as a GGSN, a data carrier may be provided via, for example, a wired IP or other packet switched network router or in a packet data gateway (PDG) of a WLAN access to a policy controlled packet mobile network.

In addition, the term policy decision function (PDF) is intended to cover all controller entities configured to provide restriction parameters such as filtering criteria or QoS parameters for controlling data sessions.

It is also noted herein that while the above describes exemplifying embodiments of the invention, there are several variations and modifications which may be made to the disclosed solution without departing from the scope of the present invention as defined in the appended claims.

The invention claimed is:

1. A system, comprising:
a data carrier including at least two data sessions from a user equipment, wherein at least one of the two data session is established before another one of the at least two data sessions; and
a controller configured to provide control, wherein the at least two data sessions on the data carrier are policy controlled using a policy controller selected by the controller from among a plurality of policy controllers, wherein the same selected policy controller controls the at least two data sessions, wherein the controller is further configured to provide at least one of an application, a server and a network element with information about the same selected policy controller to enable the at least one of the application and the server to communicate with the same selected policy controller, wherein the at least two data sessions are included in a packet data protocol context and are policy controlled based on communications between the at least one of the application and the server and the same selected policy controller.

2. The system as claimed in claim 1, wherein the controller comprises a master policy controller.

3. An apparatus, comprising:
a first policy controller configured to receive a request for policy control for at least one of a plurality of data sessions on a data carrier, the request received from at least one of an application and a server, the first policy controller configured to select one of a plurality of policy controllers and forward the received request to the selected one of the plurality of policy controllers, wherein the first policy controller forwards the received request based on at least a user equipment identity to enable the same selected policy controller to provide policy control for the plurality of data sessions from a user equipment identified by the user equipment identity.

4. The apparatus as claimed in claim 3, wherein the first policy controller comprises a master policy controller.

5. The apparatus of claim 3, wherein the first policy controller forwards the received request based on at least one of a load sharing or a user identity.

6. A method, comprising:
receiving, at a first policy controller from an application and/or a server, a request for policy control for a data session;
selecting, by the first policy controller, one of a plurality of policy controllers; and
forwarding, by the first policy controller, the received request to the selected one of the plurality of policy controllers, wherein the forwarding is based on at least a user equipment identity to enable the same selected one of the policy controllers to provide policy control for the plurality of data sessions from a user equipment identified by the user equipment identity.

7. The method of claim 6, wherein forwarding comprises forwarding the received request based on at least one of a load sharing, the user equipment identity, or a user identity.

8. The method of claim 6, wherein the data session is between the user equipment and an application function of an internet protocol multimedia subsystem.

9. The method of claim 6, wherein the data session is associated with a first application function and another, subsequent data session is associated with a second application function, such that the first data session and the other data session, carried on the data carrier to the user equipment, are under the policy control of the same selected one of the plurality of policy controllers.

10. The method of claim 6, wherein when another request for another data session on a data carrier to the user equipment is received, the first policy controller forwards the other request to the same selected one of the plurality of policy controllers.

11. A non-transitory computer-readable storage medium configured to store instructions of a computer program that when executed controls a processor to perform at least the following:
receiving, at a first policy controller from at least one of an application and a server, a request for the policy control for the a data session;
selecting, by the first policy controller, one of a plurality of policy controllers; and
forwarding, by the first policy controller, the received request to the selected one of the plurality of policy controllers, wherein the forwarding is based on at least a user equipment identity to enable the same selected one of the policy controllers to provide policy control for the plurality of data sessions from a user equipment identified by the user equipment identity.

* * * * *